April 7, 1959 J. W. DUDLEY 2,881,408
INDUCTIVE COUPLING FOR SONAR APPARATUS
Filed Feb. 4, 1955 2 Sheets-Sheet 1

INVENTOR.
JOHN W. DUDLEY
BY
*Joseph E Ryan*
ATTORNEY

INVENTOR.
JOHN W. DUDLEY

United States Patent Office 2,881,408
Patented Apr. 7, 1959

2,881,408
INDUCTIVE COUPLING FOR SONAR APPARATUS

John W. Dudley, Seattle, Wash., assignor to Minneapolis-Honeywell Regulator Company, Minneapolis, Minn., a corporation of Delaware Application February 4, 1955, Serial No. 486,151

2 Claims. (Cl. 340—3)

My invention relates to a novel inductive coupling for distance measuring devices and more particularly relates to a novel inductive coupling that allows for more complete freedom in rotational and translational movement.

In distance measuring devices it has been common to use antennas or transducers which act both for sending and reception of the sensing signal. In many instances the antenna or transducer is caused to rotate continuously in one direction, as well as being required to be raised or lowered to provide a change in sense or elevation. These mechanical operations have made the electrical connections from the moving member to the fixed member difficult, expensive, and unreliable. These connections have been limited to such devices as brushes and slip rings, concentric coils alone, and other such means that normally allow for purely rotational movement. It has been desirable in the past to have both rotational and translational movement, but past devices have been too complex.

It is the primary object of this invention to provide an inductive device that permits continuous rotating coupling while still being capable of allowing translational movement between the fixed and moving members.

A further object is to provide an inexpensive and simply constructed rotatable inductive coupling capable of movement in two planes.

Another object of this invention is to provide a dependable, relatively rotatable, constant inductive coupling.

These and other objects will become apparent from the reading of the following specification when considered with the drawings herewith attached.

Figure 1:
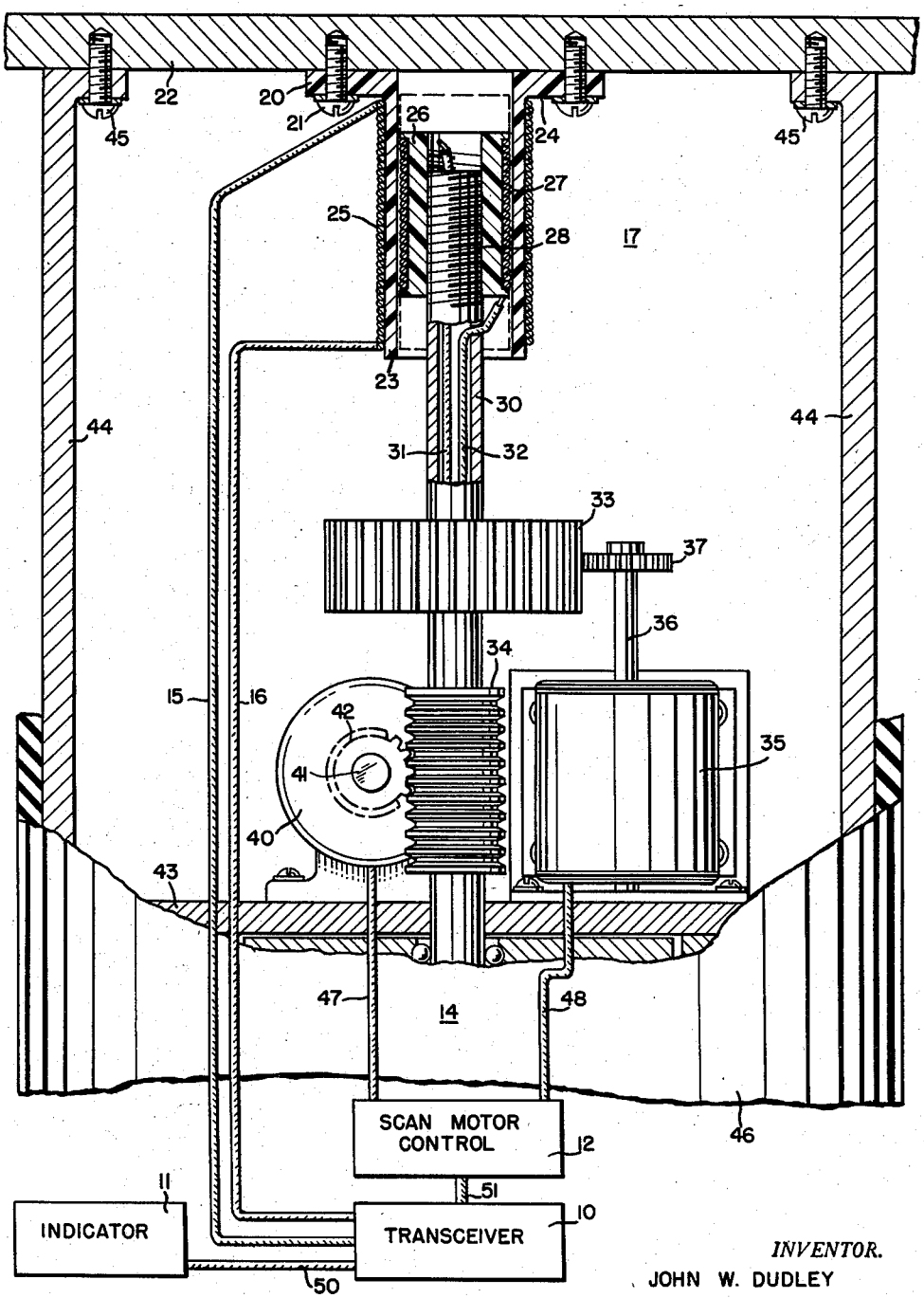
Figure 2:
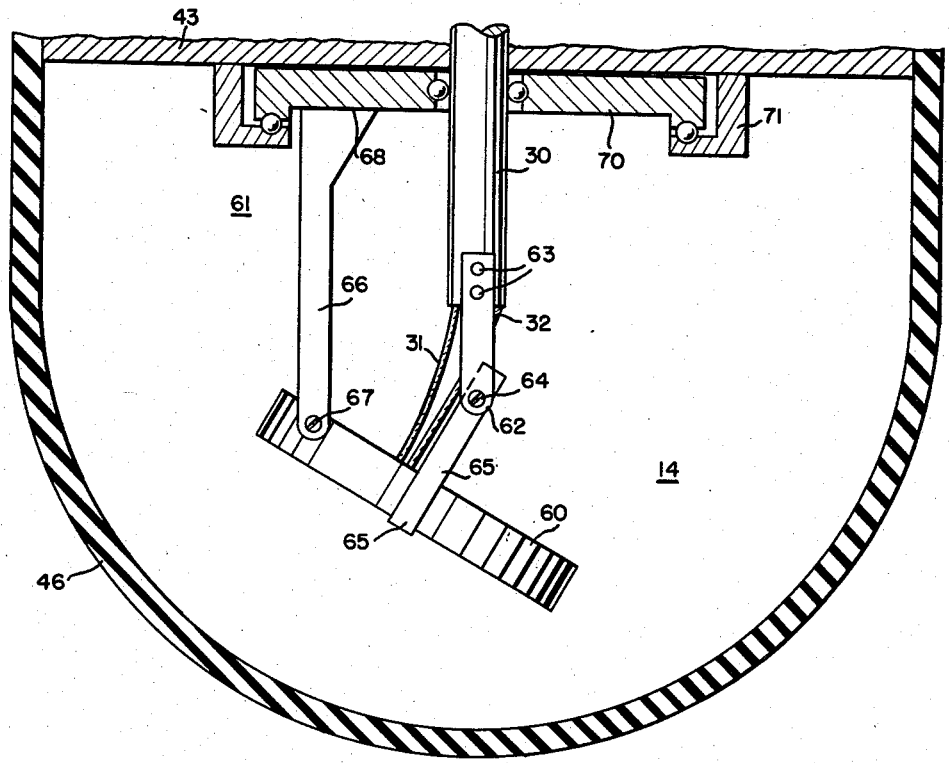

Figure 1 discloses the upper section of the transducer operator which contains the novel coupling device;

Figure 2 discloses the lower section of the transducer operator which contains the transducer and further discloses the means of utilizing both the translational and rotational motion.

In the drawings the transceiver 10, indicator 11, scan motor control 12 and transducer operator 14 form a distance measuring or object locating device of the general type disclosed in detail in the W. H. Gille and R. E. Mitchell patent application Serial No. 386,988, filed October 19, 1953, now Patent No. 2,776,396, and in the Mitchell patent application Serial No. 391,967, filed November 13, 1953, now Patent No. 2,826,726. In operation the transceiver 10 transmits a short pulse of high frequency sound through the transducer operator 14. If this sound strikes an object it is reflected back to the transducer operator 14 and is returned to the transceiver 10. The time of transit of the sound is converted to distance and shown on the indicator 11. A transducer operator 14 is herein shown in a simplified form but can be similar to the operator shown in detail in the R. J. Allyn application Serial No. 419,484, filed March 29, 1954, now Patent No. 2,829,360.

In the presently disclosed transducer operator 14 the signal is transmitted to and from the transceiver 10 via the cables 15 and 16 which connect to the novel inductive coupling device shown generally at 17. This coupling consists of a bobbin 20 which is mounted by conventional screw means 21 to any convenient structure 22. Bobbin 20 can be made of any convenient insulating, nonmagnetic material having a tubular part 23 and a base 24. Around the entire tubular part 23 is wound a coil 25 whose ends are connected to cables 15 and 16.

Inside bobbin 20 is a cylindrical bobbin 26 which is shorter than the bobbin 20 and of such a size as to allow a coil 27 to be wound upon it. Bobbin 26 and coil 27 are made to freely allow both rotational and translational movement of themselves with respect to the inside of bobbin 20. The cylindrical bobbin 26 is mounted on a hollow tube 30 by any convenient means, such as threads 28. Leads from coil 27 are connected to cables 31 and 32 in the hollow of tube 30 which in turn connect to the transducer 60.

Tube 30 has mounted upon it two gears 33 and 34. Gear 33 is driven by motor 35, shaft 36, and pinion 37 and provides rotational relative motion between coils 25 and 27. Gear 34 is driven by motor 40, shaft 41, and pinion 42 and provides translational relative motion between coils 25 and 27. Motors 35 and 40 are mounted on a plate 43 in any convenient manner to drive tube 30 which passes through plate 43 and is supported by bearing members 70 and 71 to allow the necessary freedom of motion. Plate 43 is attached to the brackets 44 and these brackets are in turn mounted on structure 22 by screw means 45. The protective cover 46 is provided over brackets 44 and mounted thereto by any convenient method.

Bearing members 70 and 71 are formed to allow free rotational and translational movement of tube 30 as well as to support the transducer control mechanism shown generally at 61. This control mechanism consists of a fixed supporting arm 62 rigidly attached to tube 30 by screws 63. A pivot 64 near the end of arm 62 supports a second supporting arm 65 which is in turn rigidly attached to the transducer 60 by any convenient means. Also attached to the transducer 60 is a third supporting member 66 which is pivotally supported to transducer 60 and 67 and is rigidly attached to bearing 70 at 68, as by a weld. With this arrangement, as the tube 30 is raised or lowered by the operation of motor 40 and its associated gearing the transducer control mechanism 61 causes the transducer 60 to be tilted. This allows full selection of the elevation scanned by the distance measuring device. As tube 30 turns it carries arms 62, 65, 66 and bearing 70 with it by freely rotating against bearing 71. As can be seen the two motions can be carried out simultaneously or independent of one another, as the case may be, and allows complete freedom of selection of the direction of the transducer 60.

Coils 25 and 27 are thus rotatable with respect to each other to provide a substantially constant coupling and are operated by the scan motor control 12 by energizing motors 35 and 40 through cables 47 and 48. The indicator 11 is synchronized to the transducer position through cable 50, transceiver 10, cable 51 and the scan motor control 12. By this arrangement the coupling coil 27 is allowed to rotate any number of degrees, or even continuously, without fear of damage. This specific coupling arrangement is illustrative only and in considering this invention I wish to be limited only by the appended claims.

I claim as my invention:

1. A distance measuring device comprising an indicator, a transceiver including output means, two concentric coils with said first coil being longer than said second coil and being energized from said output means, a transducer electrically and mechanically connected to said second coil, scan motor control means controllably operating said transducer, said coils being slidably and rotatably related to provide substantially constant coupling regardless of the relative positions of said coils.

2. A distance measuring device comprising, a transceiver including common input and output means, a transducer controllably vibrated at ultrasonic frequencies and including common input and output means, two concentric coils operatively coupling said first and second common input and output means, a scan motor control including means to rotate and tilt said transducer and means to move said coils in rotational and translational relative motion in conjunction with said transducer movement, an indicator operatively connected with said transceiver and transducer to indicate the transient time and direction of said ultrasonic vibrations.

References Cited in the file of this patent

UNITED STATES PATENTS

| | | |
|---|---|---|
| 2,379,800 | Hare | July 3, 1945 |
| 2,383,475 | Dodington | Aug. 28, 1945 |
| 2,417,188 | Clark | Mar. 11, 1947 |
| 2,432,982 | Braddon | Dec. 23, 1947 |
| 2,475,363 | Turner | July 5, 1949 |